United States Patent [19]
Rajala et al.

[11] Patent Number: 5,344,259
[45] Date of Patent: Sep. 6, 1994

[54] METHOD AND DEVICE FOR DRILLING OF HOLES INTO A MANTLE OF A CYLINDER IN A PAPER MACHINE

[75] Inventors: Kari Rajala; Seppo Parviainen, both of Jyväskylä, both of Finland

[73] Assignee: Valmet Paper Machinery Inc., Finland

[21] Appl. No.: 982,518

[22] Filed: Nov. 27, 1992

[30] Foreign Application Priority Data

Nov. 29, 1991 [FI] Finland .................................. 915664

[51] Int. Cl.$^5$ .......................... B23B 35/00; B23B 41/12
[52] U.S. Cl. .......................................... 408/46; 408/48; 408/92
[58] Field of Search .................. 408/51, 52, 53, 92, 408/95, 97, 46, 48; 483/32

[56] References Cited

U.S. PATENT DOCUMENTS

| | | | |
|---|---|---|---|
| 3,246,544 | 4/1966 | Cooper | 408/52 |
| 3,822,958 | 7/1974 | Lewis | 408/46 |
| 4,185,943 | 1/1980 | Hautau | 408/46 |
| 4,674,925 | 6/1987 | Thornton et al. | 408/1 R |
| 5,090,846 | 2/1992 | Hakala et al. | 408/1 R |

FOREIGN PATENT DOCUMENTS

| | | |
|---|---|---|
| 0018345 | 10/1980 | European Pat. Off. . |
| 0448947 | 10/1991 | European Pat. Off. . |
| 2205285 | 10/1972 | Fed. Rep. of Germany . |
| 2701516 | 7/1978 | Fed. Rep. of Germany . |
| 901367 | 9/1991 | Finland . |

Primary Examiner—Mark Rosenbaum
Assistant Examiner—Kenneth J. Hansen
Attorney, Agent, or Firm—Steinberg, Raskin & Davidson

[57] ABSTRACT

A method and device for drilling holes into a mantle of a cylinder used in a paper machine are disclosed. The drilling device includes a base frame and a spindle box displaceable on support of the base frame towards a cylinder mantle to be machined. The spindle box includes a number of drill bits and a drive motor arranged to move the spindle box to produce a feed movement for the drill bits. In the spindle box, a second motor is arranged to rotate the drill bits simultaneously. The rotating drive of the drill bits is obtained by means of the second motor which rotates a drive belt arranged to pass via drive pulleys of the drill bits so that the drive pulleys and drill bits are rotated. Each drill bit comprises a horizontally displaceable slide frame. Coupling devices are arranged between each displaceable slide frame and the spindle box, by means of which each slide frame can be locked in the desired horizontal position so as to adjust the positions of the drill bits.

20 Claims, 8 Drawing Sheets

METHOD AND DEVICE FOR DRILLING OF HOLES INTO A MANTLE OF A CYLINDER IN A PAPER MACHINE

BACKGROUND OF THE INVENTION

The invention relates to a method and device for perforating a mantle of a cylinder in a paper machine, in particular the mantle of a drying cylinder used in a drying group of the paper machine.

At the present time, conventional non-perforated cylinders in a drying group can be converted to so-called UNO-Vac vacuum or suction cylinders by perforating the cylinder mantle. However, when working on drying cylinders in the drying group of a paper machine, the drying cylinders are removed from their place in the machine and then carried aside away from the machine for machining and perforating if desired.

In Finnish Patent Application No. FI 901367, corresponding to U.S. Pat. No. 5,090,846, assigned to the assignee of the instant application, a method and device are described whereby the perforation of a cylinder mantle is carried out on-site at the paper mill where the paper machine is located without detaching the cylinder from the paper machine. Furthermore, in this reference a device is described in which a drilling machine for perforating the cylinder mantle moves on support of separate guides in the axial direction of the cylinder. During the machining and perforating process, the drilling unit is supported both on a mantle face of the cylinder that is being machined, and on a mantle face of an adjacent cylinder.

In FI 901367, the device comprises a spindle box in a multi-spindle drilling machine. Each spindle box contains a unit, e.g. a motor, for rotating drill bits and related power transmission means for simultaneous rotation of all of the drill bits in the drilling machine. The drill bits are placed side by side in the drilling machine. The device further comprises a cylinder, by whose means the jig of the drill bits, i.e. a drill guide, is brought into contact with the face of the cylinder being machined. As the device is supported both on the cylinder being machined and on another adjacent cylinder, which constitutes a support base for the drill guides, a unified, robust structure is formed which permits undisturbed, precise drilling during the machining of the cylinder.

Furthermore, in FI 901367, the spindle box is displaceable relative to the main frame of the drilling machine. A second motor is located in the spindle box and is arranged to displace the spindle box and the drills located therein whereas the first motor is located in the spindle box and is arranged to rotate the drill bits. The drill bits are placed in a fixed position in relation to one another. Therefore, the spacing of grooves in the cylinder being machined must also be fixed because it is preferable that the perforations of the cylinder mantle are placed in the bottom of the grooves.

However, since the spacing of the grooves may vary from cylinder to cylinder, the fixed position of the drill bits will adversely affect the alignment of the drill bits with the grooves so that the perforations may not be drilled into the grooves. This results in an unfavorable arrangement caused by the inflexibility of the drill bits within the drilling machine.

OBJECTS AND SUMMARY OF THE INVENTION

It is an object of the present invention to provide a new and improved drilling method and device in which the drawbacks of the prior art are eliminated whereby the drill bits are not in fixed positions in the drilling machine.

It is another object of the present invention to provide a new and improved drilling method and device having advantages over the drilling device described in Finnish Pat. Appl. No. FI 901367.

It is yet another object of the present invention to provide a new and improved drilling method device in which the spacing between adjacent drill bits is adjustable.

It is still another object of the present invention to provide a new and improved drilling method and device in which a rotating movement is transmitted to all of the drill bits arranged in a spindle box by means of a drive pulley.

Briefly, in a device in accordance with the invention used in a method in accordance with the invention, each drill bit in the spindle box comprises a horizontally displaceable slide frame. A rotatable drill shaft is connected to each of the slide frames. The drill shafts are connected to and rotated by means of a drive pulley. The drill shaft is journalled by means of bearing means to revolve in relation to the slide frame. Coupling means are arranged between the spindle box and each displaceable slide frame. By means of the coupling means, each slide frame can be locked in the desired horizontal position for the drilling process.

In the device, a drilling machine is mounted on a base frame. A first motor is arranged to rotate the drive pulley which in turn will rotate each of the drill shafts. A second motor is arranged to displace the spindle box relative to the base frame in order to produce a feed movement for the drill bits when the drill bits are moved toward a mantle face of a cylinder to be machined. A drive belt is rotated by the first motor and is arranged to pass via the drive pulley in order to rotate all of the drill bits.

In a method in accordance with the invention, drilling equipment comprising a multi-spindle drilling machine is transferred along guide rails to a desired site in proximity to a first cylinder to be machined. The drilling equipment is arranged on support of a mantle face of the first cylinder and on a mantle face of an adjacent second cylinder during the drilling process. The guide rails are supported against the second cylinder while the drilling equipment is tensioned between the mantle face of the first cylinder and the mantle face of the second cylinder. A drill guide is moved into contact with the first cylinder. In order to produce the rotation movement so that the drill bits rotate and perforate the cylinder mantle, a drive belt is arranged to run over drive pulleys connected to the drill bits so that the rotational movement is conveyed to all of the individual drill bits.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
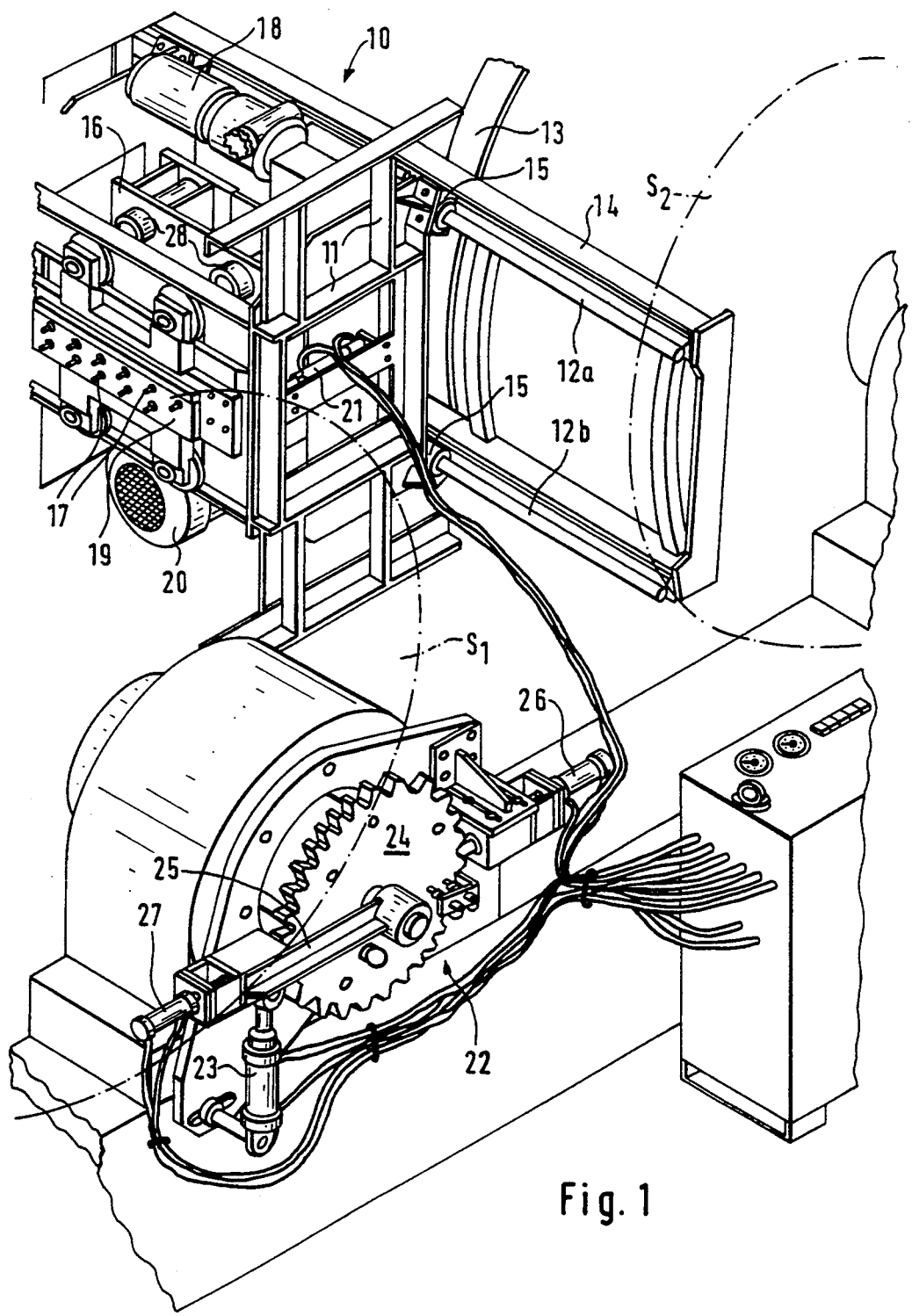
FIG. 1 is an axonometric view of a device in accordance with the invention used in a method in accordance with the invention.

FIG. 1 is an axonometric view of a drilling device in accordance with the invention which is used in a method in accordance with the invention. The drilling device of the present invention is generally denoted by reference numeral 10 and comprises a base frame 11 supported on guides 12. The drilling device 10 is arranged in a machining location between two adjacent cylinders $S_1$ and $S_2$ of a paper machine. The guides 12 are supported and fixed on the mantle of cylinder $S_2$. Guides 12a and 12b are connected to a frame part 14 which is supported on a face of the cylinder $S_2$ by means of fastening belts 13 (one belt is shown in the FIG. 1). The belts 13 are passed around the cylinder $S_2$. Guides 12a and 12b pass in an axial direction of the cylinder over the width of the cylinder mantle.

The base frame 11 of the drilling equipment 10 comprises slide bushings 15. The base frame 11 is manually displaceable in the axial direction of the cylinder after each drilling cycle on support of the slide bushings 15.

In accordance with the invention, the drilling device 10 further comprises a spindle box 16 with drill bits 17 located therein. A motor 18 is connected to the spindle box for rotating the drill bits 17. In the embodiment shown in FIG. 1, a first drive means, motor 18, simultaneously rotates twelve drill bits 17 placed side by side. Also attached to the spindle box 16 is a second drive means, motor 20, for displacing the spindle box 16, and drill bits 17 placed therein. The displacement motor 20 produces a feed movement for the drill bits 17 and/or moves the drill bits 17 apart from the mantle of the cylinder being drilled after the drilling process is completed.

A drill guide 19 is brought into contact with the cylinder mantle face to be machined before the drilling operation is started. An actuator 21 causes the drill guide 19 to move into contact with the cylinder face. The actuator 21 is preferably a cylinder device. During the drilling operation, the drilling device 10 is supported both on the cylinder $S_1$ to be machined and on the adjacent cylinder $S_2$. Thus, the drill guide 19 is tensioned against the face of the cylinder to be machined by means of the actuator 21 and the overall structure of the drilling device becomes rigid and stable. Precise drilling of the cylinder face can be accomplished because vibrations during the machining are minimized.

In FIG. 1, reference numeral 22 denotes equipment for rotating the cylinder to be machined. Rotation equipment 22 comprises a cogwheel 24 and a rotation lever 25 connected to an axle of the cylinder $S_1$. A lifting cylinder 23, on completion of its working stroke, shifts the lever 25 upwards and rotates the cylinder $S_1$ to be machined to the next working step, i.e. the next row, after the preceding row has been drilled by the drilling device 10. The rotational movement corresponds to one tooth gap of the cogwheel 24. Cylinder $S_1$ is locked by means of a locking cylinder 26, 27 in a fixed position during the machining procedure when the cylinder mantle is being machined and perforated.

Figure 2:
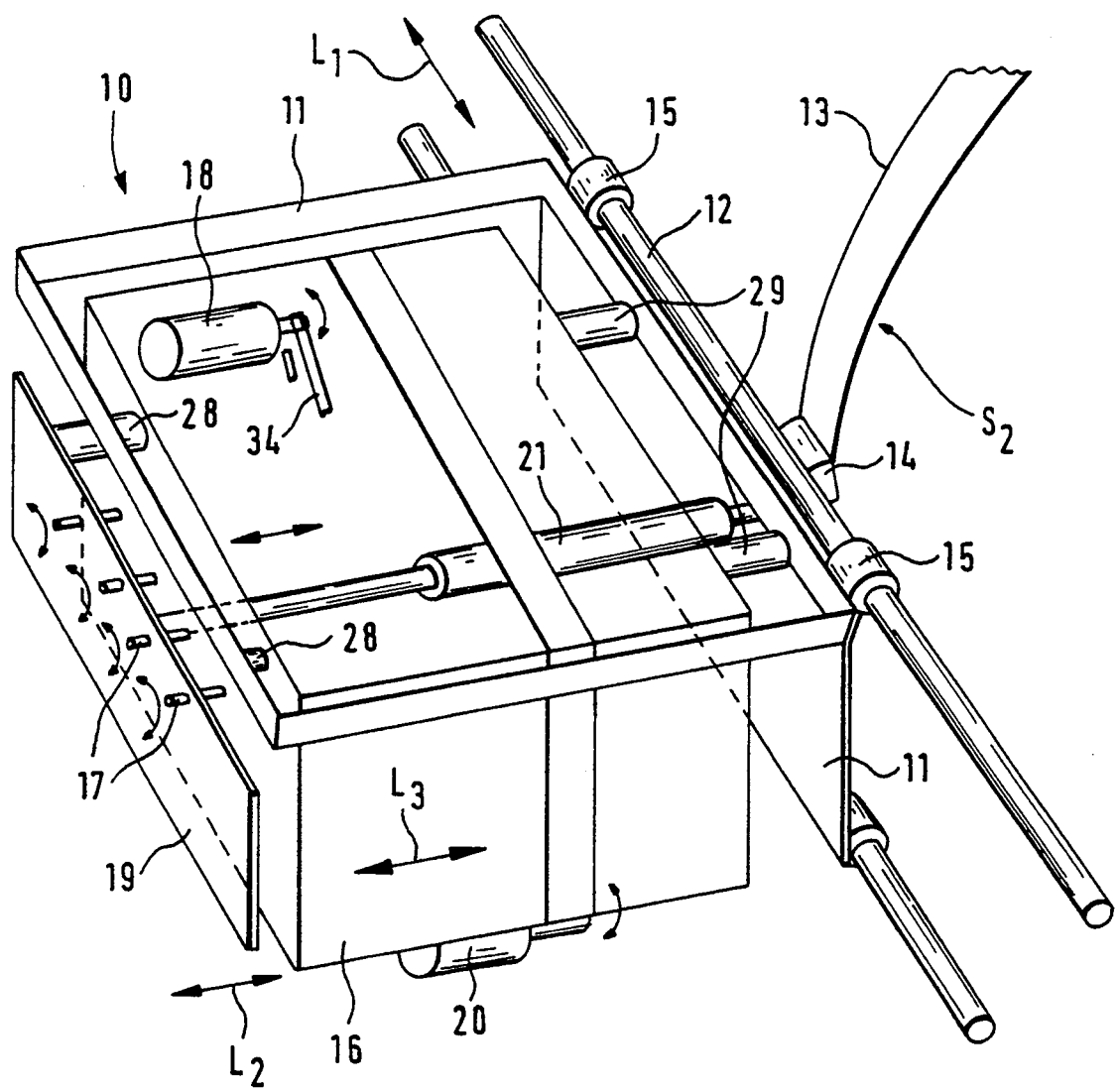
FIG. 2 is a schematic illustration of the drilling equipment of a device in accordance with the invention used in a method in accordance with the invention.

FIG. 2 is a schematic illustration of the main components of the drilling device 10 in accordance with the invention. The drilling device 10 comprises a base frame 11 supported on guides 12 by means of slide bushings 15 connected to the base frame 11. Guides 12 are connected to a frame part 14. Frame part 14 is attached by means of a fastening belt 13 to a cylinder adjacent to the cylinder to be machined $S_2$. A spindle box 16 is displaced in relation to the base frame 11 by means of a displacement motor 20. The spindle box 16 comprises a number of drill bits 17 placed side by side. Drill bits 17 are rotated by means of a rotation motor 18. Rotation motor 18 and displacement motor 20 are arranged in fixed positions in relation to the spindle box 16.

A drill guide 19 is displaceable relative to the spindle box 16 when guided by separate guide shafts 28. The displacement of the drill guide 19 is produced by means of an actuator 21 passed through the spindle box 16. The actuator 21 is preferably a cylinder device. By operating the cylinder device 21, the drill guide 19 is brought into contact with the roll mantle of the cylinder to be machined before the drilling process is started.

Figure 3A:
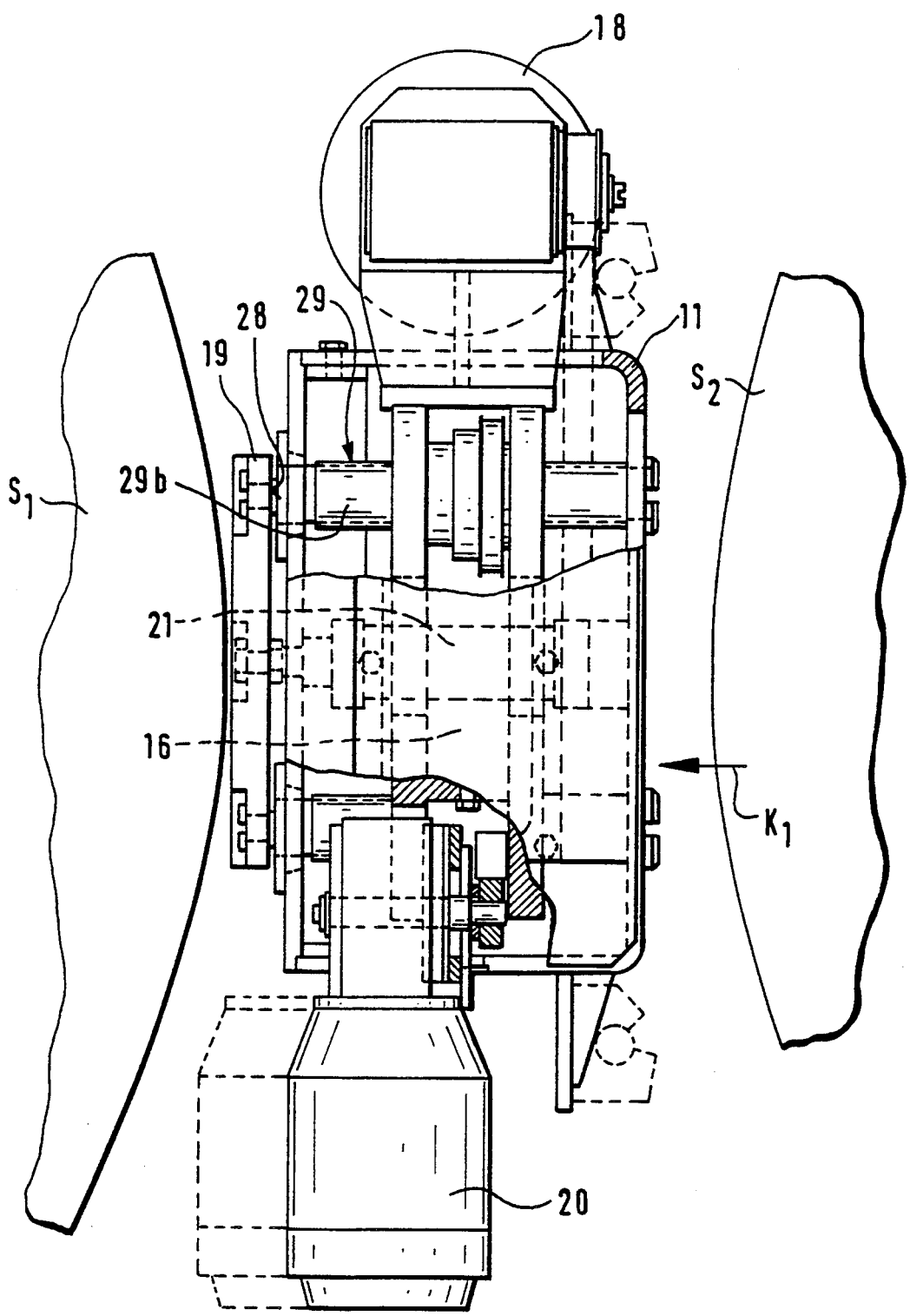
FIG. 3A is a side view of a device in accordance with the invention used in a method of the present invention.

As shown in FIG. 3A, guide shafts 28 glide in guide bushings 29b arranged in ends of guide shafts 29 of the spindle box 16. The cylinder frame of the cylinder device 21 is attached at one of its ends to base frame 11. Drill guide 19 is attached to an end of a piston rod of the cylinder device 21.

Referring to FIGS. 1 and 2, the drilling operation of the device in accordance with the present invention is as follows. Drilling device 10 is fixed to the cylinder $S_2$ adjacent to the cylinder $S_1$ to be machined by means of fastening belts 13 (in FIG. 2, one belt 13 is shown). The device 10 is displaced (arrow $L_1$) along the guides 12 into a drilling position. By means of the cylinder device 21, the drill jig, i.e. the drill guide 19, is moved into contact with a face of the cylinder to be machined $S_1$ (arrow $L_2$). The spindle box 16, with the drill bits 17 arranged inside, is moved by displacement motor 20 towards the cylinder $S_1$ to be machined (arrow $L_3$). The movement of the spindle box 16 is guided by the shafts 29. The rotation of the drill bits 17 is started, i.e. the rotation motor 18 is switched on and the drilling operation begins.

Upon completion of drilling operation, the sequence of operations is reversed, and the drilling device 10 is shifted to a new drilling position along the guides 12 guided by the slide bushings 15.

FIG. 3A is a side view of a device in accordance with the invention. The drill guide or drill jig 19 is moved into contact with the face of the cylinder $S_1$ to be machined by means of the cylinder device 21. Drill jig 19 is guided in the same manner as guide shafts 28 attached to the jig are guided in the bushing-shaped ends 29b of shafts 29. Shaft 29 is supported at both of its ends on the base frame 11. Rotation motor 18 rotates the drill bits 17 while displacement motor 20 produces a feed movement of the drill bits 17 which shifts the spindle box 16, and the drill bits 17 placed therein, towards the cylinder $S_1$ to be machined.

Figure 3B:
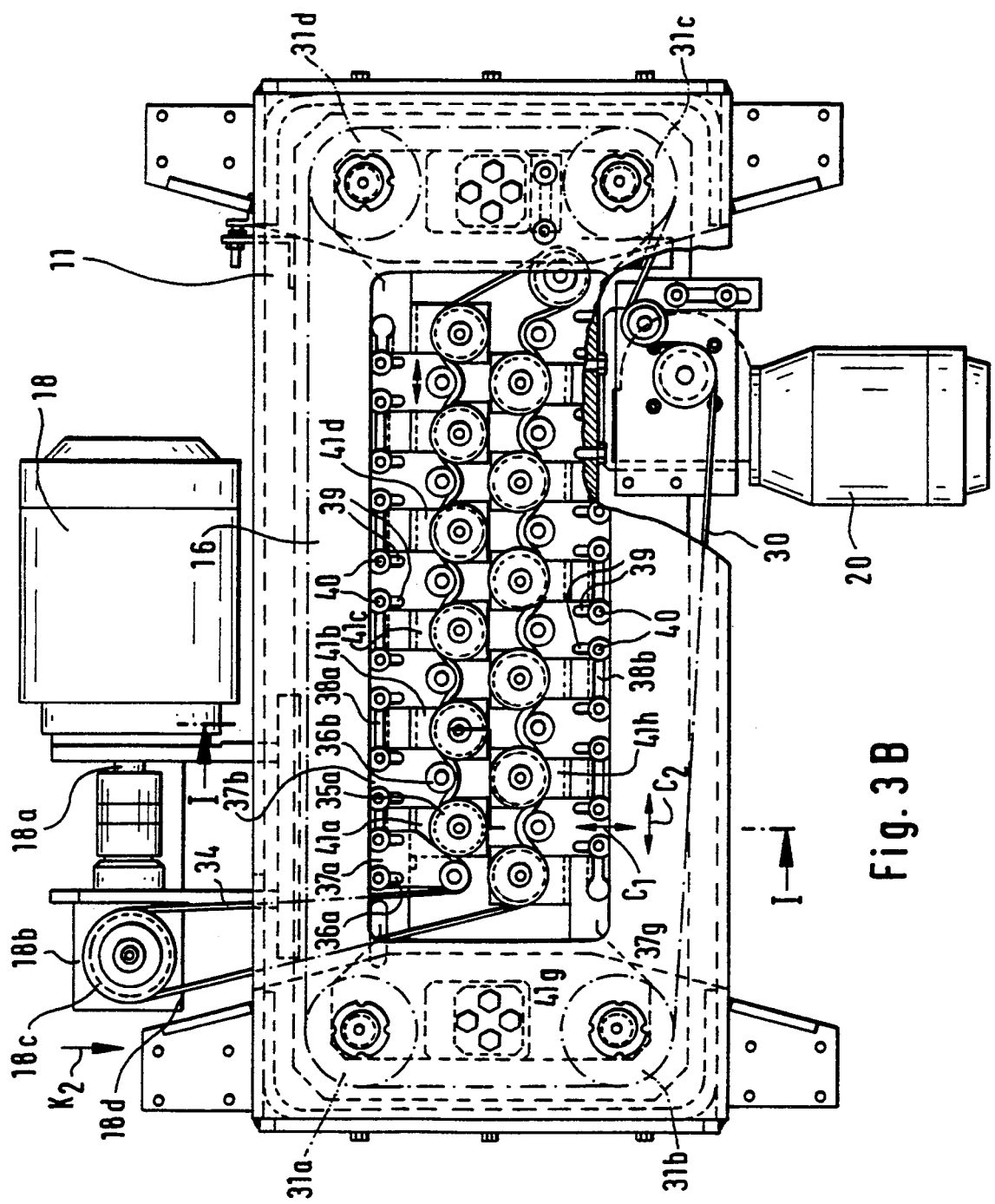
FIG. 3B shows the device illustrated in FIG. 3A seen in the direction of the arrow $K_1$ in FIG. 3A.

FIG. 3B shows a view in the direction of arrow $K_1$ of the device as shown in FIG. 3A. As illustrated in FIG. 3B, motors 18 and 20 are attached to the spindle box 16. Motor 18 is arranged so that its output shaft 18a is coupled with a drive pulley 18c through a transmission 18b. Drive pulley 18c is arranged to drive and rotate a drive belt 18d.

Drive belt 18d is preferably a cogged belt which is arranged to run meandering in the spindle box over guide pulleys 36a, 36b. . . and over drive pulleys 35a, 35b. . . which are connected to respective drill bit 17a, 17b. . . and placed between the guide pulleys. The drive pulleys 35a, 35b. . . are preferably cogged-belt pulleys arranged to mesh with the drive belt so that upon movement of the drive belt, the drive pulleys, and consequently the drill bits, will be rotated.

Drill bits 17a, 17b. . . and drive pulleys 35a, 35b. .. are placed in slide frames 41a, 41b. . . , respectively. Each slide frame 41a, 41b. . . is adjustable with respect to its horizontal position (arrow $C_2$) so that the spacing of the drill bits in relation to one another is adjustable. The tensioning and guide pulleys 36a, 36b. . . are arranged to tension the belt 18d and are placed in slide frames 37a, 37b. . . of their own. The position of each slide frame 37a, 37b. . . and guide pulley 36a, 36b. . . placed on the slide frames, is adjustable both vertically (as indicated by the arrow $C_1$) and horizontally (as indicated by the arrow $C_2$) by shifting the slide frames 37a, 37b. . . in the desired direction. Guide grooves 38a, 38b. . . are also located in the spindle box 16, whereby each slide frame 37a, 37b. . . can be shifted to a desired location in the guide groove 38a, 38b. . . and locked in the desired location by adjusting screws 40.

Each slide frame 37a, 37b. . . comprises vertical guide grooves 39. The position of the slide frame is also adjustable in the vertical direction (arrow $C_1$). By adjusting the position of the slide frame 37a, 37b. . . in the grooves 39, it is possible to adjust the desired horizontal and vertical position of the guide pulley 36a, 36b. . . placed in the slide frame 37a,37b . . . , respectively.

A cogged belt 30 is rotated by means of motor 20 connected to the spindle box. The cogged belt 30 runs over cogged-belt pulleys 31a,31b. . . located in the spindle box 16 and moves the spindle box 16, and drill bits 17a,17b,17c. . . placed therein, to produce a feed movement of the drill bits. When the direction of rotation of the motor 20 is reversed, the direction of movement of the spindle box 16 is also reversed. Thus, a feed movement is produced for the drill bits 17a,17b. . . by motor 20 toward the cylinder mantle in the drilling process, and when the direction of rotation of the motor 20 is reversed, the drill bits 17a,17b are pulled away from the cylinder $S_1$ being machined, i.e. after the drilling process is completed.

Figure 3C:
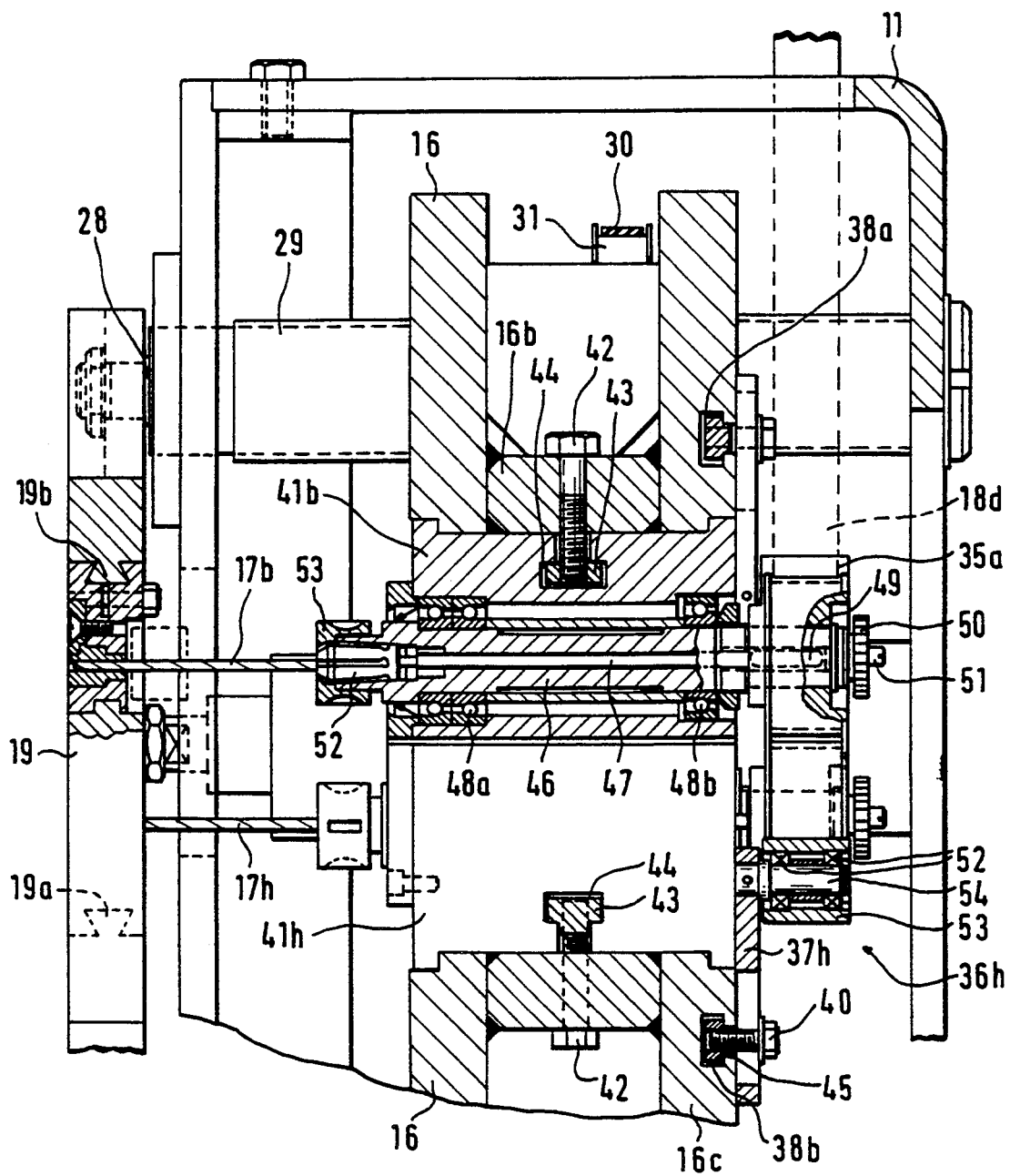
FIG. 3C is a sectional view of the device illustrated in FIG. 3B taken along the line I—I in FIG. 3B.

FIG. 3C is a sectional view of the drilling device 10 taken along the line I—I in FIG. 3B. As illustrated in FIG. 3C, the mutual spacing of the drill bits 17 is adjustable. Drill guide 19 is also provided with adjusting means that permit adjustment. As illustrated in FIG. 3C, drill guide 19 comprises a displaceable slide frame 19' which is guided in dovetail guides 19a, 19b of the drill guide 19 in the lateral direction into a position corresponding to the position into which drill bit 17 is shifted relative to slide frame 19'. Thus, the position of the drill bits will correspond to the position of the drill guide 19 during the drilling process.

As is shown in FIG. 3C, the drilling device comprises slide frames 41a, 41b. . . , which are displaceable in a lateral direction and fixed at a desired location during the drilling process. The drilling device further comprises an adjusting screw 42 passed through a plate construction 16b of the spindle box 16. An end of the adjusting screw 42 is coupled by means of a screw threading to a tightening nut 43. Tightening nut 43 passes in a backed-off groove 44 which is machined into each slide frame 41a, 41b. . . 41h. . . . The assembly of the adjusting screw 42, tightening nut 43 and backed-off groove 44 constitute coupling means. In each slide frame 41a, 41b. . . 41h. . . , a drill shaft 46 is mounted revolvingly by bearing means 48a, 48b. Drill bit 17b can be attached to drill shaft 46 in the desired position by means of a cone 52 and a tightening nut 53. The adjustment of the position of the drill bit 17 takes place so that the drill bit 17 is displaced by means of an adjusting rod 47 passing through the drill-bit frame 46. The position of the adjusting rod 47, also referred to as a displaceable rod, can be adjusted by means of a screw 51 and locked by means is of a nut 50. The drill shaft 46 receives its movement of rotation from the drive pulley 35 connected at one of its ends. Drive pulley 35 is rotated by the belt 18d which is rotated by motor 18.

In FIG. 3C, a second slide frame 41h is shown which comprises a drill bit 17h. In a corresponding manner to that described above, the horizontal position of this slide frame 41h is adjustable in relation to the spindle box 16 by screw means 42.

In the embodiment shown in FIG. 3C, the slide frame 37h of the guide pulley 36h is connected with the spindle box 16 at its frame plate 16c. The adjustment of the position of the slide frame in groove 38b takes place by means of a screw 40 which is coupled with a nut 45 placed in the groove 38b. When the screw 40 is rotated, the nut 45 can be tightened in the groove 38b against a face of the groove. Thus, the slide frame 37h can be locked in the desired position in the groove 38b.

Guide pulley 36h comprises a wheel part 53 which is mounted so that it can revolve on shaft 54 by means of bearing means 52. The shaft 54 is fixed in a stationary position on the slide frame 37h.

Figure 3D:
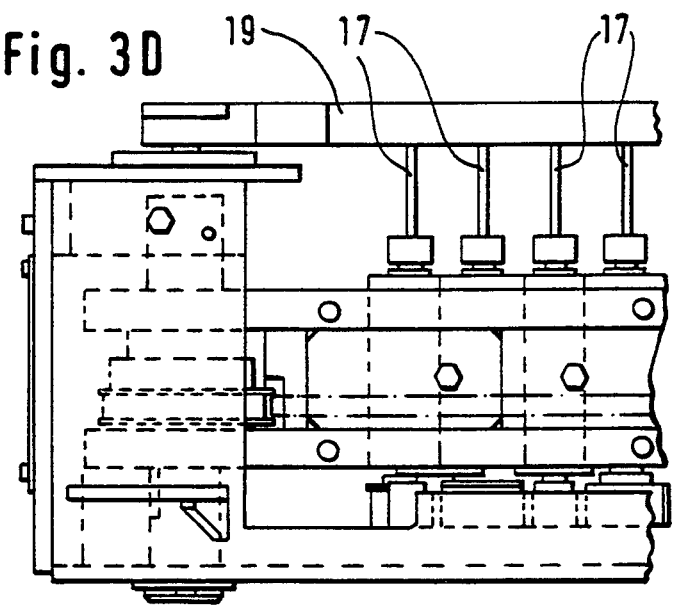
FIG. 3D is a partial illustration of the device illustrated in FIG. 3B as seen in the direction of arrow $K_2$ in FIG. 3B.

FIG. 3D is an illustration of part of the drilling device illustrated in FIG. 3B as seen in the direction of arrow $K_2$.

Figure 4A:
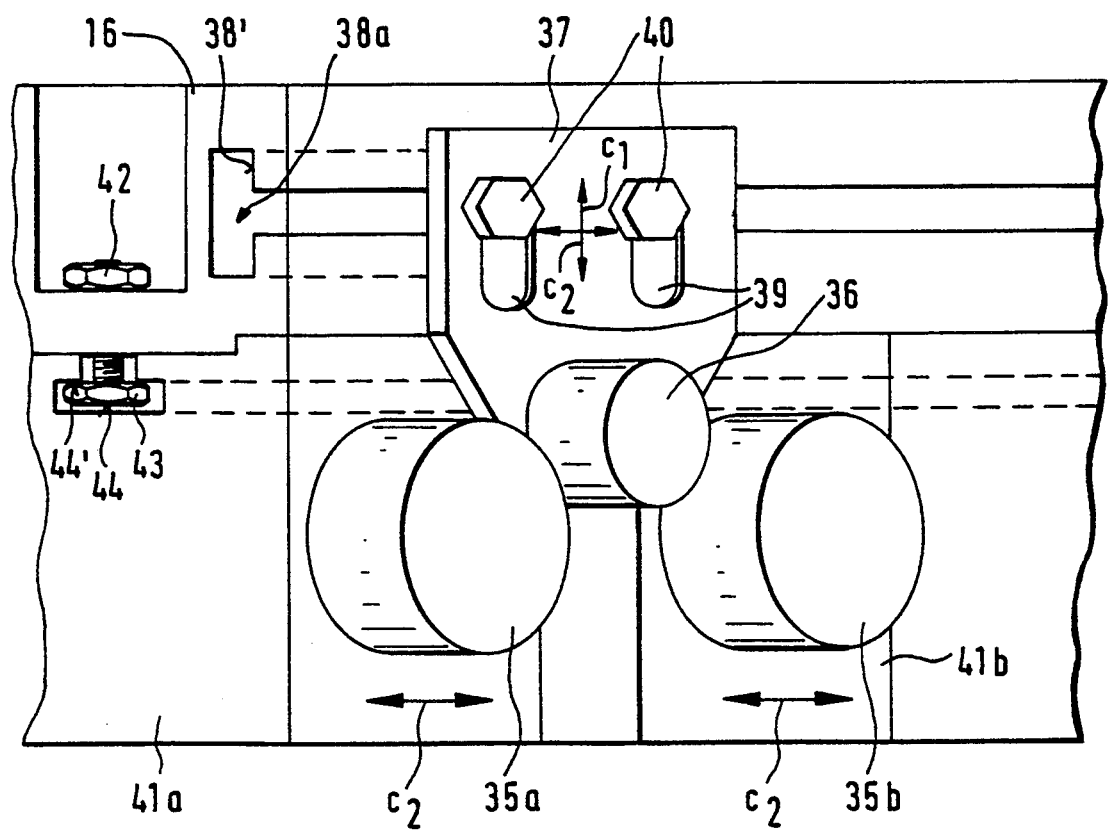
FIG. 4A is an axonometric illustration of an arrangement of equipment for adjusting the spacing of adjacent drill bits in a device in accordance with the invention used in a method of the present invention.

FIG. 4A illustrates the part of the device of the present invention in which the adjustment of the positions of the drill bits is achieved. In the embodiment shown in FIG. 4A, drive pulleys 35a, 35b of the drill bits are journalled and fixed in their slide frames 41a, 41b. The slide frames 41a, 41b are displaceable and adjustable in respect of their positions in the horizontal direction as indicated by arrow $C_2$ relative to the spindle box 16.

Slide frames 41a, 41b comprise a backed-off guide groove 44. When a screw 42 is rotated, a nut 43, or equivalent, can be connected to the face 44' of the backed-off groove 44. In a corresponding manner, the slide frame 37 of the guide pulley 36 is displaceable in a horizontal direction indicated by arrow $C_2$ and also in a vertical direction as indicated by arrow $C_1$. Slide frame 37 comprises vertical grooves 39 through which adjusting screws 40 are passed. Slide frame 37 is moved in a backed-off groove 38a in the spindle box 16 to a desired position and locked in that position by means of adjusting screws 40 by rotating the screws and by bringing the nut 45, or a corresponding locking part, into contact with a top face 38' of the backed-off groove 38a.

Figure 4B:
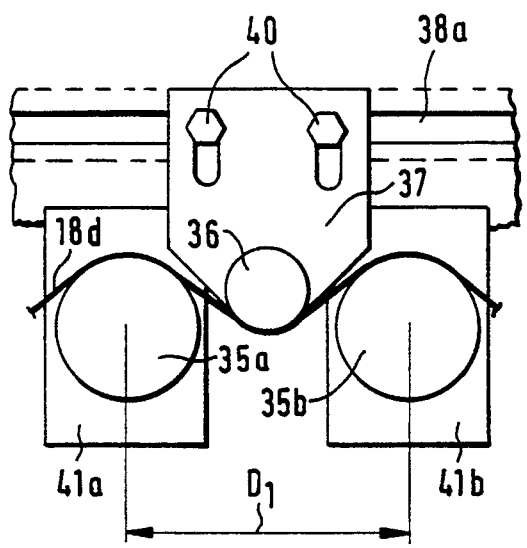
FIGS. 4B and 4C illustrate the process of adjusting the spacing of adjacent drill bits of a device in accordance with the invention used in a method of the present invention.
Figure 4C:
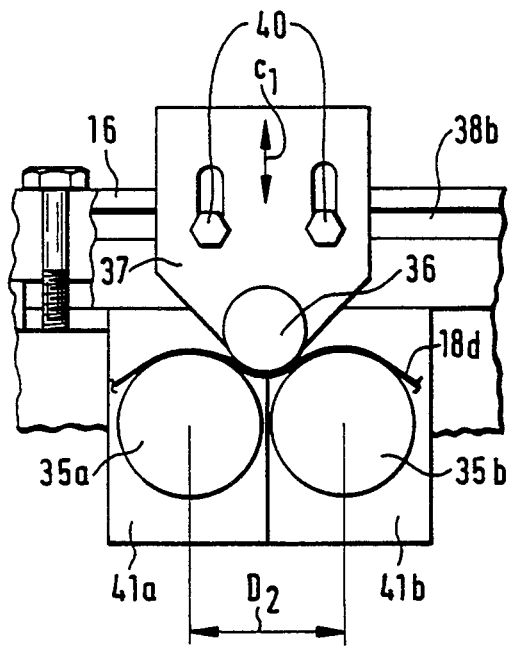

FIGS. 4B and 4C illustrate the process of the adjustment of the positions of the drill bits 17a, 17b, connected to drive pulleys 35a, 35b, respectively, relative to one another. The distance between the drill bits is $D_1$, as shown in FIG. 4B, and, after adjustment, the distance between the drill bits is $D_2$, as shown in FIG. 4C. In the adjusting process, the slide frames 41a, 41b have been shifted towards each other, and the slide frame 37 of the guide pulley 36 has been raised in the direction $C_l$.

Figure 4D:
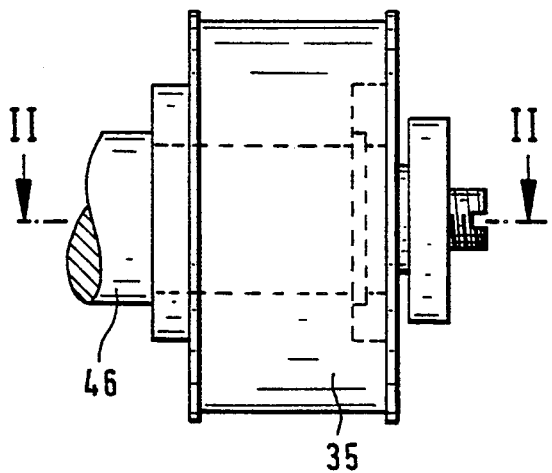
FIG. 4D is an illustration of a drive pulley used in a method and device in accordance with the invention as seen from the end of a drill shaft.

FIG. 4D illustrates the rotation of the drill shaft 46 of the drill bit. The drive pulley 35 is coupled with the drill shaft 46.

Figure 4E:
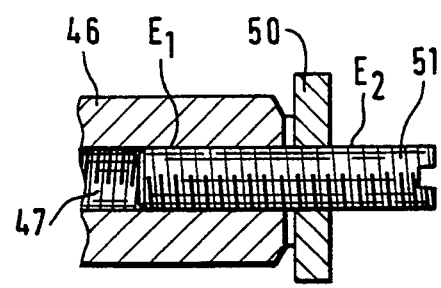
FIG. 4E is a sectional view of the drill shaft illustrated in FIG. 4D taken along the line II—II in FIG. 4D.

FIG. 4E is a sectional view taken along the line II—II in FIG. 4D with the drive pulley 35 removed. Inside the shaft 46 of rotation, an adjusting rod 47 is located which is displaceable in a screw threading $E_1$ provided in a center hole 46' in the drill shaft 46. Locking of the adjusting rod 47 at a desired location takes place by rotating a locking wheel 50 on external threading $E_2$ at an end of the adjusting rod 47. The adjusting rod 47 abuts against an end of the drill bit 17 (not shown). The desired stroke length of the drill bit is obtained by altering the position of the adjusting rod 47.

Figure 5:
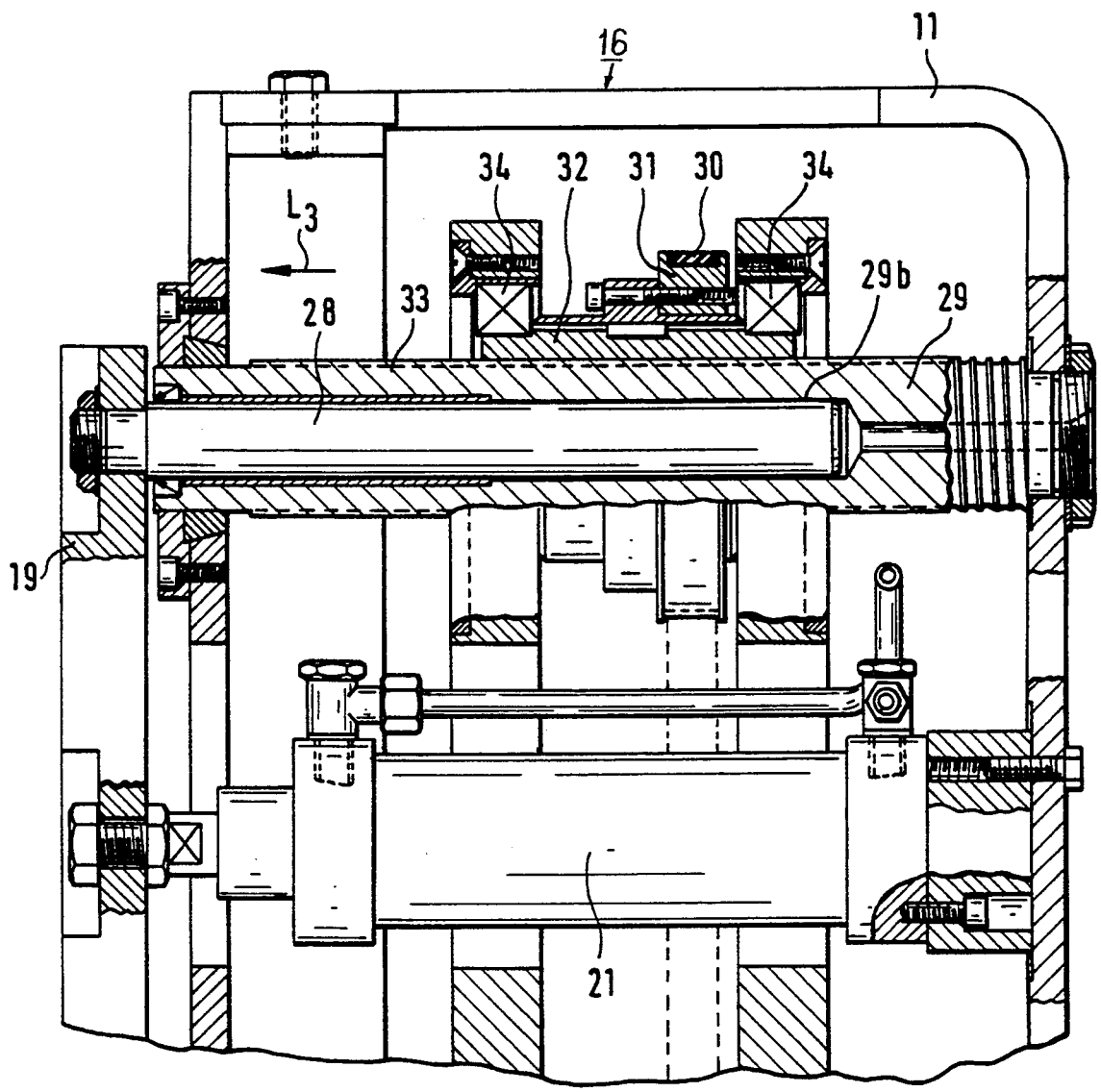
FIG. 5 is a sectional view of an arrangement of equipment for displacing the spindle box and the drill guide used in a method and device in accordance with the invention.

FIG. 5 is a more detailed illustration of the displacement of the spindle box and the arrangement of displacement of the drill guide in the present invention. Each cogged-belt pulley 31 comprises an inside ball nut 32 both of which are rotated by means of a cogged belt 30. A ball screw 33 is passed through the ball nut 32 to enter into the guide shaft 29 and is jointly operative with the ball nut 32. Ball screw 33 is permanently fixed at both of its ends to the base frame 11. Ball nut 32 is mounted on the spindle box 16 by means of bearings 34. When the displacement motor 20 (not shown in FIG. 5) of the spindle box 16 is rotated, the cogged belt 30 and cogged-belt pulleys 31 are also rotated. In addition, the spindle box 16 and related means, such as the drill bits, are displaced in the direction indicated by arrow $L_3$ towards the cylinder being machined.

Before the drilling is started, the drill guide 19 is moved into contact with the cylinder face to be machined by means of the actuator 21. The drill guide 19 is moved on support of guide shafts 28, and guided by the guide bushing 29b of the guide shaft 29 of the spindle box 16, into a precise position in relation to the cylinder to be machined.

Upon completion of the drilling operation, the direction of rotation of the displacement motor 20 of the spindle box 16 is reversed, and the spindle box 16 with the related drill bits 17 is shifted out of contact with the cylinder that was machined and readied for the next drilling process on the next cylinder to be machined.

The examples provided above are not meant to be exclusive. Many other variations of the present invention would be obvious to those skilled in the art, and are contemplated to be within the scope of the appended claims.

What is claimed is:

1. A device for drilling holes into a mantle of a cylinder in a paper machine, comprising
    a base frame,
    a drilling machine mounted on said base frame and comprising a spindle box having a plurality of drill bits, each of said drill bits comprising a displaceable first slide frame,
    first drive means for rotating said drill bits,
    second drive means for displacing said spindle box relative to said base frame so as to produce a feed movement for said drill bits when said drill bits are moved toward a mantle face of a cylinder to be machined,
    guides for supporting said base frame,
    slide bushings arranged on said base frame for guiding said base frame and said spindle box along said guides when said drilling machine is shifted to the next drilling position in the direction of the longitudinal axis of the cylinder being machined,
    a fastening belt for supporting said guides, and
    a drill guide, said device being mounted on support of a cylinder adjacent to the cylinder to be machined and being tensioned during the drilling process between the cylinder to be machined and the adjacent cylinder by bringing said drill guide into contact with the mantle face of the cylinder to be machined by means of an actuator.

2. The device as claimed in claim 1, wherein said spindle box further comprises
    rotatable drill shafts connected to each of said first slide frames and to said drill bits,
    drive pulleys connected to said drill shafts for rotating said drill shafts, said drive pulleys being rotated by said first drive means to thereby cause said drill bits to rotate,
    bearing means for journalling said drill shafts such that said drill shafts revolve relative to said first slide frames, and
    coupling means arranged between said spindle box and said first slide frames, said coupling means structured and arranged to lock each of said first slide frames in a desired horizontal position when said cylinder is being machined 3. The device as claimed in claim 1, wherein said spindle box further comprises
    tensioning and guide pulleys arranged to guide said first drive means in said spindle box,
    second slide frames on which said guide pulleys are situated, and
    means to move said second slide frames in horizontal and vertical directions such that said guide pulleys are moved to a desired horizontal and vertical position relative to said spindle box.

4. A device for drilling holes into a mantle of a cylinder in a paper machine, comprising
    a base frame,
    a drilling machine mounted on said base frame and comprising a spindle box having a plurality of drill bits, each of said drill bits comprising a displaceable slide frame,
    first drive means for rotating said drill bits,
    second drive means for displacing said spindle box relative to said base frame so as to produce a feed movement for said drill bits when said drill bits are moved toward a mantle face of a cylinder to be machined, said spindle box further comprising rotatable drill shafts connected to each of said slide frames and to said drill bits, drive pulleys connected to said drill shafts for rotating said drill shafts, said drive pulleys being rotated by said first drive means to thereby cause said drill bits to rotate, bearing means for journallying said drill shafts such that said drill shafts revolve relative to said slide frames, coupling means arranged between said spindle box and said slide frames, said coupling means structured and arranged to lock each of said slide frames in a desired horizontal position when said cylinder is being machined, an adjusting rod passing centrally through said drill shaft, a desired stroke length of said drill bit being determined by adjusting the position of said rod, a rotatable screw located at one end of said adjusting rod, said adjusting rod being displaced by rotating said screw, said adjusting rod being rotated by means of threading between said adjusting rod and said drill shaft, and a locking wheel arranged to rotate on external threading on an end of said adjusting rod, said adjusting rod being locked in a desired position by rotating said locking wheel.

5. A device as claimed in claim 4, wherein said coupling means comprise a groove arranged in said slide frame, a threaded nut arranged in said groove, and a rotatable screw coupled with the threading of said threaded nut, whereby said nut is tightened against a wall of said groove so that said slide frame is locked in a desired horizontal position during the drilling process.

6. A device as claimed in claim 4, wherein said spindle box further comprises a cogged belt operated by said second drive means, at least one cogged-belt pulley in which a ball nut is arranged, said cogged belt being passed over said cogged-belt pulley, a spindle box guide shaft for displacing said drill guide into an accurate position relative to the cylinder to be machined, said spindle box guide shaft including a ball screw jointly operative with said ball nut, said second rive means acting on said cogged belt such that said cogged-belt pulleys are rotated and said spindle box is displaced toward and away from the mantle face of the cylinder to be machined.

7. A device for drilling holes into a mantle of a cylinder in a paper machine, comprising a base frame, a drilling machine mounted on said base frame and comprising a spindle box having a plurality of drill bits and first drive means, each of said drill bits comprising a first displaceable slide frame, said drill bits structured and arranged to be rotated by said first drive means, said first drive means comprising a belt drive, said spindle box comprising second drive means structured and arranged to displace said spindle box relative to said base frame so as to produce a feed movement for said drill bits when said drill bits are moved toward a mantle face of a cylinder to be machined, said spindle box further comprising rotatable drill shafts connected to each of said first slide frames and to said drill bits, drive pulleys connected to said drill shafts for rotating said drill shafts, said drive pulleys being rotated simultaneously by said belt drive, bearing means for journalling said drill shafts such that said drill shafts revolves relative to said first slide frames, coupling means arranged between said spindle box and said first slide frames, said coupling means structured and arranged to lock each of said first slide frames in a desired horizontal position when said cylinder is being machined, tensioning and guide pulleys arranged to guide said drive belt in said spindle box, second slide frames on which said guide pulleys are situated, and means to move said second slide frames in horizontal and vertical directions such that said guide pulleys are moved to a desired horizontal and vertical position relative to said spindle box.

8. A device as claimed in claim 7, wherein said coupling means comprise a groove provided in said first slide frame, a nut having threading located in said groove, and a rotatable screw coupled with the threading of said nut, whereby said nut is tightened against a wall of said groove so that said first slide frame is locked in a desired horizontal position during the drilling process.

9. A device as claimed in claim 7, wherein said means to move said second slide frames comprise a horizontal groove formed on a side wall of said spindle box, said second slide frames of said guide pulleys being locked in a position substantially parallel to said horizontal groove, tightening nuts arranged in said horizontal groove, and said second slide frames of said guide pulleys further comprising a vertical groove through which a locking member is coupled with one of said tightening nuts such that by rotating said locking member, said second slide frames of said guide pulley are locked in the desired horizontal and vertical position relative to said spindle box.

10. A device as claimed in claim 9, wherein each of said guide pulleys comprises a wheel part journalled on a shaft by bearing means such that said guide pulley revolved relative to said shaft, said shaft being permanently fixed to said second slide frame.

11. A device as claimed in claim 7, wherein said belt drive is a cogged belt and said drive pulleys are cogged-belt pulleys.

12. A device as claimed in claim 7, further comprising a displaceable rod passed centrally through said drill shaft, a desired stroke length of said drill bit is determined by adjusting the position of said rod.

13. A device as claimed in claim 12, further comprising a rotatable screw located at one end of said rod, said rod being displaced by rotating said screw, said rod being rotated by means of threading between said rod and said drill shaft, and a locking wheel arranged to rotate on external threading on an end of said rod, said rod being locked in the desired position by rotating said locking wheel.

14. A device as claimed in claim 7, further comprising guides for supporting said base frame, and slide bushings on said base frame for guiding said base frame and said spindle box along said guide when said drilling machine is shifted to the next drilling position in the direction of the longitudinal axis of the cylinder being machined.

15. A device as claimed in claim 14, further comprising a fastening belt for supporting said guides, and a drill guide, said device being mounted on support of a cylinder adjacent to the cylinder to be machined and being tensioned during the drilling process between the cylinder to be machined and the adjacent cylinder by bringing said drill guide into contact with the mantle face of the cylinder to be machined by means of an actuator.

16. A device as claimed in claim 15, wherein said drill guide comprises dovetail guides, and displaceable slide frames directed along said dovetail guides in a lateral direction into a horizontal position corresponding to the position to which said drill bits are shifted relative to said slide frame.

17. A device as claimed in claim 7, wherein said spindle box further comprises a cogged belt operated by said second drive means, at least one cogged-belt pulley in which a ball nut is arranged, said cogged belt being passed over said cogged-belt pulley, a spindle box guide shaft for displacing said drill guide into an accurate position relative to the cylinder to be machined, said spindle box guide shaft including a ball screw jointly operative with said ball nut, said second drive means acting on said cogged belt such that said cogged-belt pulleys are rotated and said spindle box is displaced toward and away from the mantle face of the cylinder to be machined.

18. A device as claimed in claim 7, wherein said first drive means comprise a motor.

19. A device as claimed in claim 7, wherein said second drive means comprise a motor.

20. A device as claimed in claim 7, wherein said drive belt rotated by means of a rotating movement produced by said first drive means, said drive belt being arranged to pass via said drive pulleys associated with said drill bits such that the rotating movement is conveyed from said first drive means via said drive belt and said drive pulleys to said drill bits.

* * * * *